June 9, 1964  P. M. BELLOWS ETAL  3,136,485
SELF-LOADING LIQUID FERTILIZER SPREADER
Filed Jan. 8, 1963  2 Sheets-Sheet 1
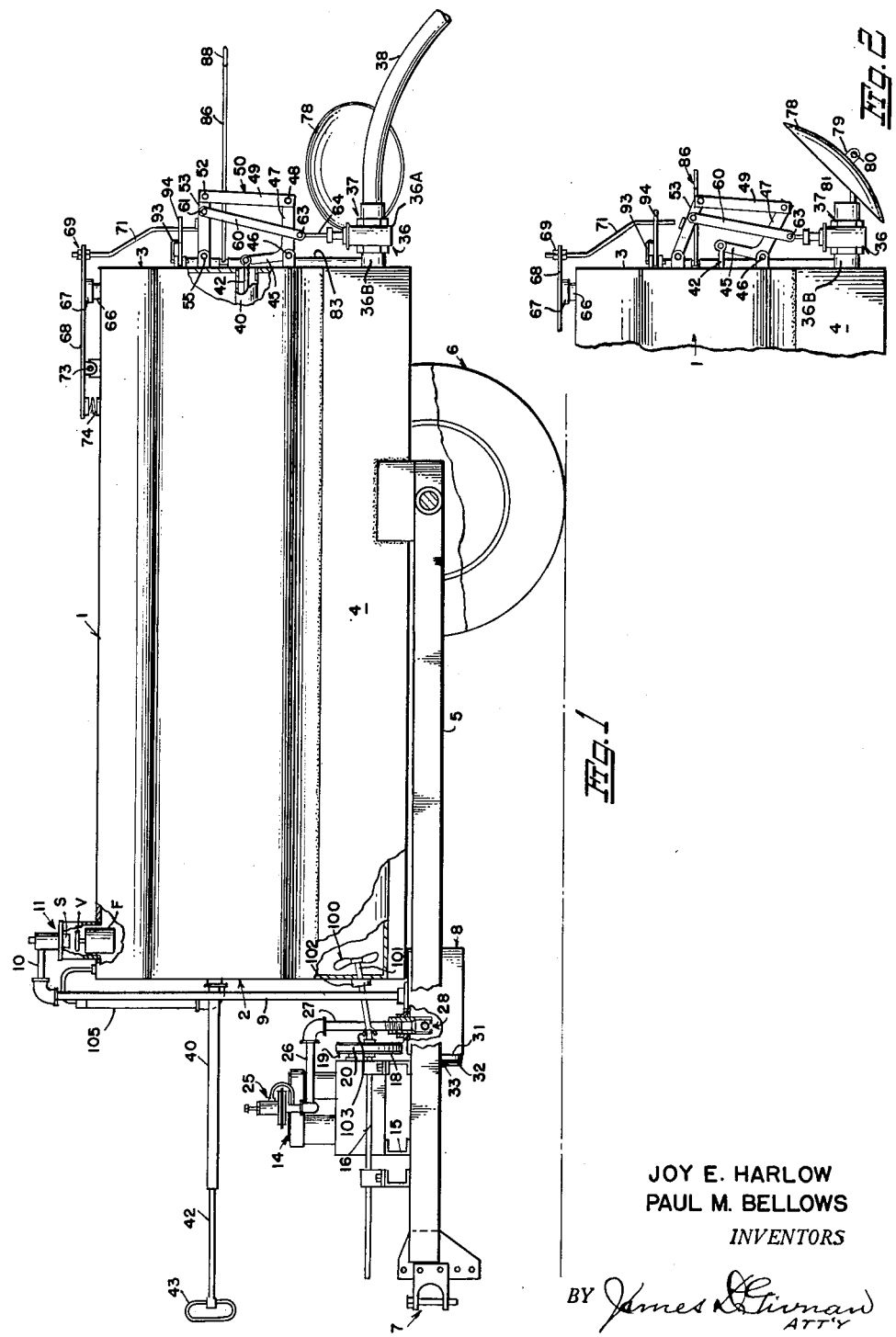
JOY E. HARLOW
PAUL M. BELLOWS
INVENTORS
BY *James L. Tirman*
ATT'Y June 9, 1964   P. M. BELLOWS ET AL   3,136,485
SELF-LOADING LIQUID FERTILIZER SPREADER
Filed Jan. 8, 1963   2 Sheets-Sheet 2
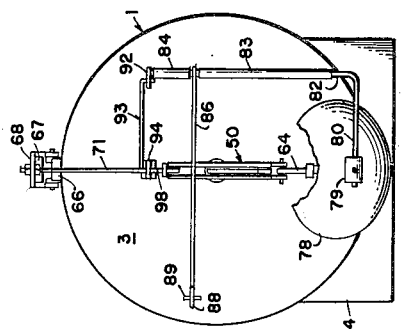
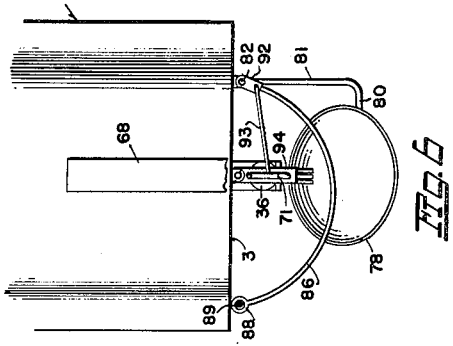
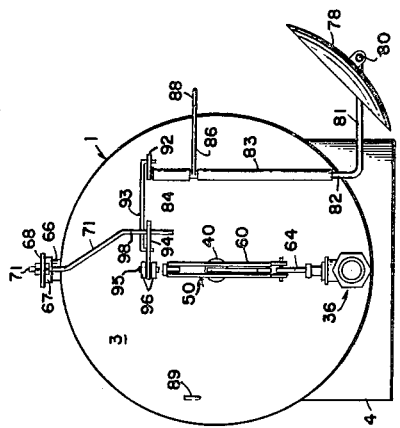
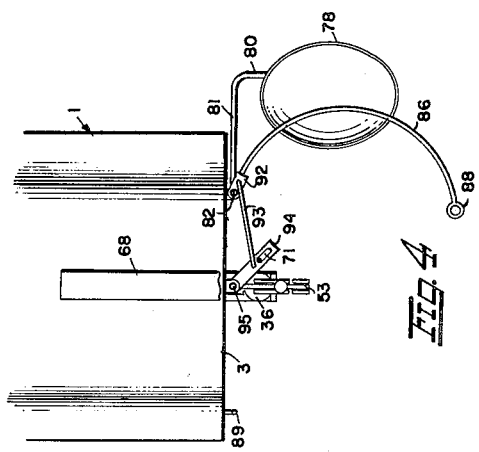
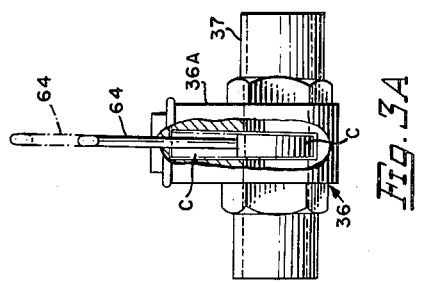
JOY E. HARLOW
PAUL M. BELLOWS
*INVENTORS*

United States Patent Office 3,136,485
Patented June 9, 1964

3,136,485
SELF-LOADING LIQUID FERTILIZER SPREADER
Paul M. Bellows, Rte. 1, Box 706, Ridgefield, Wash., and
Joy E. Harlow, P.O. Box 206, Battle Ground, Wash.
Filed Jan. 8, 1963, Ser. No. 250,038
8 Claims. (Cl. 239—172)

This invention relates to portable self-loading liquid fertilizer spreader tanks of the type shown and described in United States Patent No. 2,792,255, issued May 14, 1957, and more particularly to a method of and means for loading the spreader tank, agitating the contents thereof during transportation to desired locations and there spray-spreading it upon the ground.

It is one of the principal objects of the present invention to provide new, novel, and simplified means for drawing liquid fertilizer, such as liquid manure and the like, from a storage or holding tank directly into the spreader tank by the use of a vacuum pump power-coupled to a draft appliance for creating a suction within the spreader tank after discharge or scavenging and during the return travel time of the apparatus from a field of operation to the storage or holding tank.

Another object is to provide a unitary control operable through new and novel linkage to simultaneously close an air intake valve and a fluid discharge valve to enable vacuum build-up within the spreader tank which is a time-saving features in that the tank may be vacuumized while traveling when empty from a field of operation to the storage or holding tank. The unitary control also serves the purpose of simultaneously opening the air intake valve and the discharge valve to provide compensating air intake during discharge or spreading of the tank contents.

Another object is to provide the interior of the spreader tank with agitating means, also driven by said power coupling, to keep the inherent fertilizer solids in suspension while traveling to a field to be dealt with and also during the spray-spreading operation.

A further object is the provision of a safety tank, safety valve and an improved float valve in circuit with the vacuum pump and a built-in vacuum release valve to prevent the vacuum from exceeding 20 mercury inches. The fluid intake valve being disposed at the bottom of the spreader tank prevents the entering manure from foaming and resultant loss of a considerable percentage of the spreader's capacity.

A still further object is the provision of means to automatically stop tank loading when the tank becomes full, and a visible sight gage mounted exteriorly of the spreader tank for watching the sequential loading and stopping operations.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of a portable self-loading liquid fertilizer spreader made in accordance with our invention and with fragments broken away for clearness of illustration.

FIGURE 2 is a fragmentary side elevational view of the rearward end of FIGURE 1.

FIGURE 3 is a rear-end elevational view of FIGURE 1 with parts omitted.

FIGURE 3A is an enlarged detailed view, with fragments broken away, of a conventional gate valve which serves as an inlet valve for loading the spreader tank or as an outlet valve for the spreading operation, and for sealing off the bottom rear end of the tank when the same is being vacuumized.

FIGURE 4 is a top plan view of FIGURE 3.

FIGURE 5 is a view similar to FIGURE 3 showing the spreader in an operative position, and FIGURE 6 is a top plan view of FIGURE 5.

With continuing reference to the drawings, wherein like references of character designate like parts, and particularly FIGURE 1 thereof, reference numeral 1 indicates a liquid manure spreading tank having a front wall 2, a rear wall 3, and mounted by means of a cradle 4 upon a chassis 5 supported upon ground-engaging wheels 6.

It is to be understood, of course, that the type of trailer tank herein disclosed does not necessarily prescribe any limits of utility of the invention since obviously the invention is readily adaptable to any kind or shape of tank whether it be mobile, stationary or portable and of a strength in keeping with good engineering practices.

The longitudinal members of the chassis 5 converge at their forward ends into a trailer hitch 7 or the like for attachment to a draft appliance or vehicle, not shown.

Secured in any suitable manner between or across the chassis frame members near the forward end thereof, is a safety tank 8 in communication by means of conduits 9 and 10 through a float valve, indicated generally at 11, with the interior of the tank 1.

A vacuum pump 14 is mounted upon the chassis members forwardly of the safety tank 8 by means of channel members 15 and driven by a shaft 16, coupled to the power take-off of a tractor or similar draft appliance, not shown, and also by means of pulleys 18 and 19 and a belt 20 entrained over the pulleys. The pump 14 is in communication through a relief valve 25, pipes 26—27 and a check valve 28, with the interior of the safety tank 8.

One wall of the safety tank 8 is provided with a drainage opening 31 having a valve seat at its outermost end for cooperation with a flapper valve 32 hinged in any suitable manner as at 33 above the opening 31 so that the valve gravitationally remains closed against its seat when the tank is empty or will be sealed thereagainst by vacuum within the safety tank as will be more fully hereinafter described. In the absence of vacuum, the valve 32 will swing freely to an open position as it rides the crest of the out-flowing residual contents of the safety tank 8.

The bottom of the rear wall 3 of the spreader tank 1 has an opening therein provided with any suitable type of gate valve 36 and a suitable coupling 37 for attachment to one end of a filler hose 38 whose opposite or free end is adaptable to convey liquid manure or other fluids from a storage or holding tank, not shown, to the interior of the spreader tank 1 for filling the same. The gate valve 36 is of conventional type and comprises a casing 36A secured at its forward end to and in open communication with the interior of the tank 1 as at 36B and in communication at its opposite end through the coupling 37 with the filler hose 38. A closure member C is secured to the bottom of an actuating stem 64 for movement thereby from the closed position shown in full lines to the open position shown in broken lines in FIGURE 3A.

The float valve 11, comprises a float F responsive to fluid level within the tank and provided with a valve V for engagement with the valve seat S which is in communication with the pipe 10.

A tubular member or pipe 40 extends longitudinally through the spreader tank 1 and is sealed in any suitable manner to the front and rear walls thereof. A control rod 42 slidably mounted within the pipe 40, terminates at its forward end in a hand grip 43 and is pivotally attached at its opposite or rearward end to the top end of one arm 45 of a bellcrank pivotally attached as at 46 to the rear wall 3 of the spreader tank. The outer end of the other arm 47 of the bellcrank is pivotally attached as at 48 to a substantially vertical member 49 of a valve actuating frame indicated generally at 50. The top end of the member 49 is pivotally connected as at 52 to a top member 53 of the valve actuating frame. The inner or forward end of the frame member 53 is pivotally attached as at 55 to the rear wall 3 of the spreader tank. A pair of valve control links 60 is pivotally connected as at 61 to the frame member 53, straddles arm 47 of the bellcrank and terminates in a pivotal connection 63 to the top end of the valve stem 64 of the valve 36.

From the foregoing, it will be apparent that a forward pull on the control rod 42 will through the medium of bellcrank arm 47, frame members 49 and 53, swing the valve actuating frame 50 upwardly and that such movement through the medium of the links 60 will pull the valve stem 64 upwardly to open the valve 36 as shown in broken lines in FIGURE 3A and that movement of the control rod 42 rearwardly, or in an opposite direction, will close the valve 36 as shown in full lines.

The top rear end of the spreader tank 1 is provided with an air intake opening surrounded by a collar 86 which provides a seat for a valve 67 attached to an actuating arm 68 whose outer end is secured as at 69 to the top end of a plunger 71 whose bottom end is swingable into and out of the path of upward movement of the top member 53 of the valve-actuating frame 50, as will be more fully hereinafter described. The actuating arm 68 for the air intake valve is fulcrumed as at 73 to the top of the tank 1 and is spring-urged into a valve-closed position by a compression spring 74.

A spreader plate 78 is adjustably mounted as at 79 into the free end of a supporting rod 80 turned at a right angle as at 81 then upwardly as at 82 for pivotal mounting within vertically aligned spaced apart tubular members 83 and 84, secured in any suitable manner to the rear wall 3 of the spreader tank. A control arm 86, of arcuate shape in plan view, as shown in FIGURES 4 and 6, is welded at one of its ends to the vertical portion of the spreader plate supporting arm 82 between the tubular members 83 and 84 and provided at its opposite or free end with a terminal loop 88 for engagement with an upwardly opening hook 89, welded to the rear wall 3 of the tank 1. By this arrangement the spreader plate may be locked in an operative position, relative to the outlet of the dual purpose valve 36 as shown in FIGURES 5 and 6, or may be swung clear and away from the valve 36 as shown in FIGURES 1, 3 and 4.

The top end of the spreader plate supporting arm 82 is provided with a crank 92 to which is pivotally connected one end of a link 93 whose opposite end is similarly connected to a lever 94 swingably attached at its inner end by means of a pin 95 and a pair of lugs 96 to the rear wall 3 of the tank 1 for movement in a horizontal plane relative thereto. The outer end of the arm 94 has an opening therethrough for the reception of the bottom offset end 98 of the plunger 71.

For agitating the contents of the spreader tank during its self-loading operation, during its travel time to the field of operation and during the spreading operation, we provide an agitator in the form of any suitable type of impeller 100 secured to one end of a shaft 101 on the interior of the tank 1. The shaft is journalled in a sealed bearing 102 and coupled at its outer end, by a universal joint 103, to the drive shaft 16 for the pump 14.

Although we have shown the impeller shaft 101 directly connected to the pump drive shaft 16, it is to be understood that we may include any suitable type of coupling such as a slip clutch or a belt tightener or any other suitable means for selectively operating the agitator.

The operation of the apparatus is as follows:

Vacuum is created within the spreader tank 1 by the pump 14 when float valve 11 is open, the air intake valve 67 and the discharge valve 36 are closed, and the pump is driven by the draft appliance as aforesaid while in transit to a loading tank. Upon arrival at the loading tank, the free end of the hose 38 is inserted therein with the spreader plate 78 positioned to one side of the valve 36 as shown in FIGURE 3. This positioning of the plate 78 by the outward swing of the control arm 86, after disengagement from the hook 89, into the position shown in FIGURE 4 will, through the medium of the crank 92, line 93 and lever 94 swing the bottom end of the plunger 71 to one side and out of the path of upward movement of the top member 53 of the valve actuating frame 50 when said frame, through the medium of the links 60, pulls the closure C of the gate valve 36 upwardly into the broken line open position shown in FIGURE 3A. The valve 67 thus being undisturbed, because of the plunger 71 being rendered inactive, will remain closed so that the full effect of the vacuum within the tank 1 will be utilized for the tank-filling operation.

Closure of the float valve 11 when the tank 1 fills to capacity will prevent any fluid from being pulled into the safety tank 8 and also cause vacuum within the safety tank to build up quickly but not to exceed 20 mercury inches as aforesaid and as determined by the setting of the relief valve 25.

The apparatus, now with a full tank, is towed to the field for the spreading operation and while in transit rotation of the agitator 100, will keep the solids in the fluid contents of the tank in suspension. To start the spreading operation, the spreader plate control arm 86 is swung into the position shown in FIGURE 6 and its free end locked to the hook 89. This locates the spreader plate 78 in an operative position behind the valve 36, and such manipulation through the medium of the crank 92, link 93 and arm 94 positions the bottom end 98 of the plunger 71 in the path of upward movement of the actuating frame 50 when the frame is pulled upwardly by a forward pull of control rod 42. Such upward movement of the frame 50 and plunger 71 will simultaneously open the valve 36 and air intake valve 67 to allow free gravitational flow of the contents of the tank 1 onto and across the spreader plate 78 while allowing compensating inflow of air to the interior of the tank to the now open valve 36.

When the tank is empty, upon completion of the spreading operation, a rearward thrust on the control rod 42 will conversely close the valves 36 and 67 and in the absence of fluid within the tank the float valve 11 will gravitate to an open position. During the return trip to the loading tank, the pump 14, being driven by the shaft 16 from the draft appliance, will again build up a vacuum within the spreader tank 1 thus rendering it ready for instant refill by opening the valve 36 after inserting the filler hose into the loading tank.

The rising level of incoming fluid within the spreader tank during the filling operation, and the stoppage thereof, may be observed through the gauge glass 105.

While we have shown a particular form of embodiment of our invention, we are aware that many minor changes therein will readily suggest themselves to others skilled in the art without departing from the spirit and scope of the invention.

Having thus described our invention what we claim as new and desire to protect by Letters Patent is:

1. Apparatus of the character described comprising,
a tank,
a vacuum pump,
pipe means connecting said pump with the interior of said tank,
an air intake valve in communication with the interior of the tank,
means operable to open and close said air intake valve,
a dual purpose fluid intake and discharge valve in communication with the interior of said tank,
means movable to operatively open and close said dual purpose valve, means operable by said dual purpose valve operating means to open and close said air intake valve, and means operable to position said air intake valve operating means into and out of the path of movement of said dual purpose valve operating means to effect selective opening of the dual purpose valve alone or simultaneously opening the dual purpose valve and the air intake valve.

2. Portable self-loading fertilizer spreader apparatus comprising, a tank, a vacuum pump, a drive coupling adapted to connect the pump to the power take-off of a draft appliance, pipe means connecting said pump with the interior of said tank, an air intake valve in communication with the interior of the tank, means operable to open and close said air intake valve, a dual purpose fluid intake and discharge valve in communication with the interior of said tank, means movable to operatively open and close said dual purpose valve, means operable by said dual purpose valve operating means to open and close said air intake valve, and means operable to position said air intake valve operating means into and out of the path of movement of said dual purpose valve operating means to effect selective opening of the dual purpose valve alone or simultaneously opening the dual purpose valve and the air intake valve.

3. Self-loading liquid fertilizer spreader apparatus of the character described comprising, a closed tank substantially horizontally disposed and having a forward end and a rearward end, a power driven vacuum pump, pipe means connecting said pump with the interior of said tank, an air intake valve in communication with the interior of the tank at the rearward end thereof, means operable to open and close said air intake valve, a dual purpose fluid intake and discharge valve in communication with the interior of said tank at the rearward end thereof, a control rod slidably mounted within the tank and extending forwardly and rearwardly therefrom, a frame operatively connected to the rearward end of said control rod for movement thereby in a vertical plane, means connecting said frame to said dual purpose valve for opening and closing the same respectively by forward and rearward movement of said control rod, means swingably mounting said air intake valve operating means for movement into and out of the path of vertical movement of said frame, whereby to effect selective opening of the dual purpose valve alone for tank-filling purposes, or simultaneously opening the dual purpose valve and the air intake valve for fluid discharge.

4. A wheel-supported vehicle chassis, a closed substantially horizontally disposed self-loading fertilizer spreader tank positioned upon the chassis, and having a forward end and a rearward end, a pump mounted upon the chassis, a drive coupling adapted to connect the pump to the power take-off of a draft appliance for vacuumizing the spreader tank while in transit, a float valve in communication with the interior of said tank, a safety tank, a check valve within the safety tank, pipe means communicating said pump through said safety tank, check valve, and float valve, with the interior of said tank, whereby in the event of failure of said float valve, after the filling of said safety tank, said check valve will stop vacuumizing the safety tank and hence said spreader tank.

5. A wheel-supported vehicle chassis, a closed substantially horizontally disposed self-loading fertilizer spreader tank positioned upon the chassis, and having a forward end and a rearward end, a pump mounted upon the chassis, a drive coupling adapted to connect the pump to the power take-off of a draft appliance for vacuumizing the spreader tank while in transit, a float valve in communication with the interior of said tank, a safety tank, a check valve within the safety tank, pipe means communicating said pump through said safety tank, check valve, and float valve, with the interior of said tank, whereby in the event of failure of said float valve, and the filling of said safety tank, said check valve will stop vacuumizing the safety tank and hence said spreader tank, an air intake valve in communication with the interior of the tank at the rearward end thereof, means operable to open and close said air intake valve, a dual purpose fluid intake and discharge valve in communication with the interior of said tank at the rearward end thereof, a control rod slidably mounted within the tank and extending forwardly and rearwardly therefrom, a frame operatively connected to the rearward end of said control rod for movement thereby in a vertical plane, means connecting said frame to said dual purpose valve for opening and closing the same respectively by forward and rearward movement of said control rod, means swingably mounting said air intake valve operating means for movement into and out of the path of vertical movement of said frame, whereby to effect selective opening of the dual purpose valve alone for tank-filling purposes, or simultaneously opening the dual purpose valve and the air intake valve for fluid discharge.

6. Portable self-loading fertilizer spreader apparatus comprising, a tank, a vacuum pump, a drive coupling adapted to connect the pump to the power take-off of a draft appliance, pipe means connecting said pump with the interior of said tank, an air intake valve in communication with the interior of the tank, means operable to open and close said air intake valve, a dual purpose fluid intake and discharge valve in communication with the interior of said tank, means movable in a vertical plane to operatively open and close said dual purpose valve, means operable to position said air intake valve operating means into and out of the path of movement of said dual purpose valve operating means to effect selective opening of the dual purpose valve alone or simultaneously open the dual purpose valve and the air intake valve, said positioning means comprising a rod rotatable about a vertical axis offset therefrom at its bottom end and provided at its top end with crank means and a spreader plate at its offset bottom end, operational linkage interconnecting said crank means and said air intake valve operating means, whereby swinging of said spreader plate into a position confronting said dual purpose valve will position said air intake valve operating means in position to be acted upon by the dual purpose valve actuating means to open said air intake valve during the spreading operation of the contents of the tank and whereby said spreader plate away from the dual purpose valve will cause closing of the air intake valve while said dual purpose valve is open for tank-filling purposes.

7. Portable loading fertilizer spreader apparatus comprising,
a tank having a forward end and a rearward end,
a vacuum pump,
conduit means connecting said pump with the interior of the tank,
an air intake valve in communication with the interior of the tank at the top rear end thereof,
a dual-purpose fluid intake and discharge valve in communication with the interior of the tank at the bottom rear end thereof,
a manually operable slidably mounted control rod,
means connected to said control rod and movable thereby in a vertical plane to open and close said dual-purpose valve,
a spreader plate,
means swingably mounting said spreader plate for movement toward and away from said dual-purpose valve,
a vertically disposed plunger,
means swingably mounting said plunger and connected to said spreader plate mounting means for moving said plunger into a position for upward movement by said dual-purpose valve opening means to open said air intake valve.

8. In apparatus of the character described including a tank having a first opening therein for filling the tank or for discharging the contents thereof and a second opening for admitting air to the interior of the tank and pump means for drawing air from the interior of the tank; the improvement comprising,
a first valve for said first opening and a normally closed valve for said second opening,
first manually operable means for opening and closing said first valve,
second means for opening said normally closed valve,
means mounting said second means for selective movement into position for opening said normally closed valve upon opening of said first valve to admit air to the interior of the tank while draining the contents thereof.

References Cited in the file of this patent
UNITED STATES PATENTS

| | | |
|---|---|---|
| 2,792,255 | Bellows | May 14, 1957 |
| 2,975,978 | Propst | Mar. 21, 1961 |
| 2,985,379 | Strickland | May 23, 1961 |